United States Patent
Huang (10) Patent No.: US 10,274,039 B2
(45) Date of Patent: Apr. 30, 2019

(54) OIL SEAL HOLDER FOR SHOCK ABSORBER

(71) Applicant: Chun Po Huang, Changhua County (TW)

(72) Inventor: Chun Po Huang, Changhua County (TW)

( * ) Notice: Subject to any disclaimer, the term of this patent is extended or adjusted under 35 U.S.C. 154(b) by 792 days.

(21) Appl. No.: 14/981,117

(22) Filed: Dec. 28, 2015

(65) Prior Publication Data

US 2017/0184173 A1    Jun. 29, 2017

(51) Int. Cl.
| F16F 9/32 | (2006.01) |
| F16J 15/16 | (2006.01) |
| F16F 9/36 | (2006.01) |

(52) U.S. Cl.
CPC .............. *F16F 9/3207* (2013.01); *F16F 9/36* (2013.01); *F16J 15/166* (2013.01)

(58) Field of Classification Search
CPC ........... F16F 9/3207; F16F 9/36; F16J 15/166
See application file for complete search history.

(56) References Cited

U.S. PATENT DOCUMENTS

| 3,701,402 | A | * | 10/1972 | Chelnokov | ............. | F16F 9/185 188/269 |
| 4,010,829 | A | * | 3/1977 | Naito | .................... | B60G 17/08 188/278 |
| 4,238,009 | A | * | 12/1980 | Wossner | .............. | B60G 13/008 188/315 |
| 6,216,831 | B1 | * | 4/2001 | Taylor | ....................... | F16F 9/20 188/280 |
| 6,336,624 | B1 | * | 1/2002 | Kulhavy | ............... | F16F 9/3242 188/300 |
| 6,837,343 | B1 | * | 1/2005 | Bugaj | ................... | B60G 21/073 188/304 |
| 2002/0010977 | A1 | * | 1/2002 | Salice | ...................... | E05F 5/02 16/49 |
| 2004/0035660 | A1 | * | 2/2004 | Coombs | .................... | F16F 9/36 188/322.17 |
| 2004/0079225 | A1 | * | 4/2004 | Reiser | ................... | F16F 9/3242 92/165 R |
| 2006/0070836 | A1 | * | 4/2006 | Beck | ....................... | F16F 9/064 188/322.16 |
| 2009/0140496 | A1 | * | 6/2009 | Otani | ...................... | F16F 9/36 277/562 |

(Continued)

FOREIGN PATENT DOCUMENTS

JP        1998-381909        *  6/1998

*Primary Examiner* — Eugene G Byrd (57) ABSTRACT

An oil seal holder for a shock absorber contains: a body, plural push members, and plural resilient elements. The body includes a first semi-circular ring and a second semi-circular ring, and a rear end of the first semi-circular ring is connected with a rear end of the second semi-circular ring. The body also includes a retainer configured to retain with or remove from a front end of the first semi-circular ring and a front end of the second semi-circular ring. The plural push members are mounted and radially move on the first semi-circular ring and the second semi-circular ring, and each push member includes an abutting post extending out of the first semi-circular ring or the second semi-circular ring. The plural resilient elements are connected with the first semi-circular ring and the second semi-circular ring so as to push the plural push member inward.

7 Claims, 10 Drawing Sheets

(56) References Cited

U.S. PATENT DOCUMENTS

| | | | |
|---|---|---|---|
| 2009/0152779 A1* | 6/2009 | Imoto | F16F 9/36 267/129 |
| 2009/0223758 A1* | 9/2009 | Sakai | F16F 7/09 188/267 |
| 2013/0187316 A1* | 7/2013 | Vandine | F16F 9/3405 267/126 |
| 2013/0228069 A1* | 9/2013 | Cappeller | F16J 10/00 92/169.1 |
| 2015/0041265 A1* | 2/2015 | Yamashita | F16F 9/18 188/315 |
| 2015/0096855 A1* | 4/2015 | Takeo | B60G 13/02 188/322.12 |
| 2015/0184715 A1* | 7/2015 | Tomiuga | B62K 25/04 188/297 |

* cited by examiner

OIL SEAL HOLDER FOR SHOCK ABSORBER

FIELD OF THE INVENTION

The present invention relates to an oil seal holder which is applicable for shock absorber of various sizes and is operated quickly and easily.

BACKGROUND OF THE INVENTION

A conventional oil seal holder is disclosed in TW Publication No. 476862 and is adapted for a shock absorber of a fixed size. In addition, the conventional oil seal holder is operated troublesomely.

The present invention has arisen to mitigate and/or obviate the afore-described disadvantages.

SUMMARY OF THE INVENTION

The primary objective of the present invention is to provide an oil seal holder which is applicable for shock absorber of various sizes and is operated quickly and easily.

To obtain the above objective, an oil seal holder for a shock absorber provided by the present invention contains: a body, plural push members, and plural resilient elements.

The body includes a first semi-circular ring and a second semi-circular ring, and a rear end of the first semi-circular ring is connected with a rear end of the second semi-circular ring. The body also includes a retainer configured to retain with or remove from a front end of the first semi-circular ring and a front end of the second semi-circular ring.

The plural push members are mounted and radially move on the first semi-circular ring and the second semi-circular ring, and each push member includes an abutting post extending out of the first semi-circular ring or the second semi-circular ring.

The plural resilient elements are connected with the first semi-circular ring and the second semi-circular ring so as to push the plural push member inward.

DETAILED DESCRIPTION OF THE PREFERRED EMBODIMENTS

Figure 1:
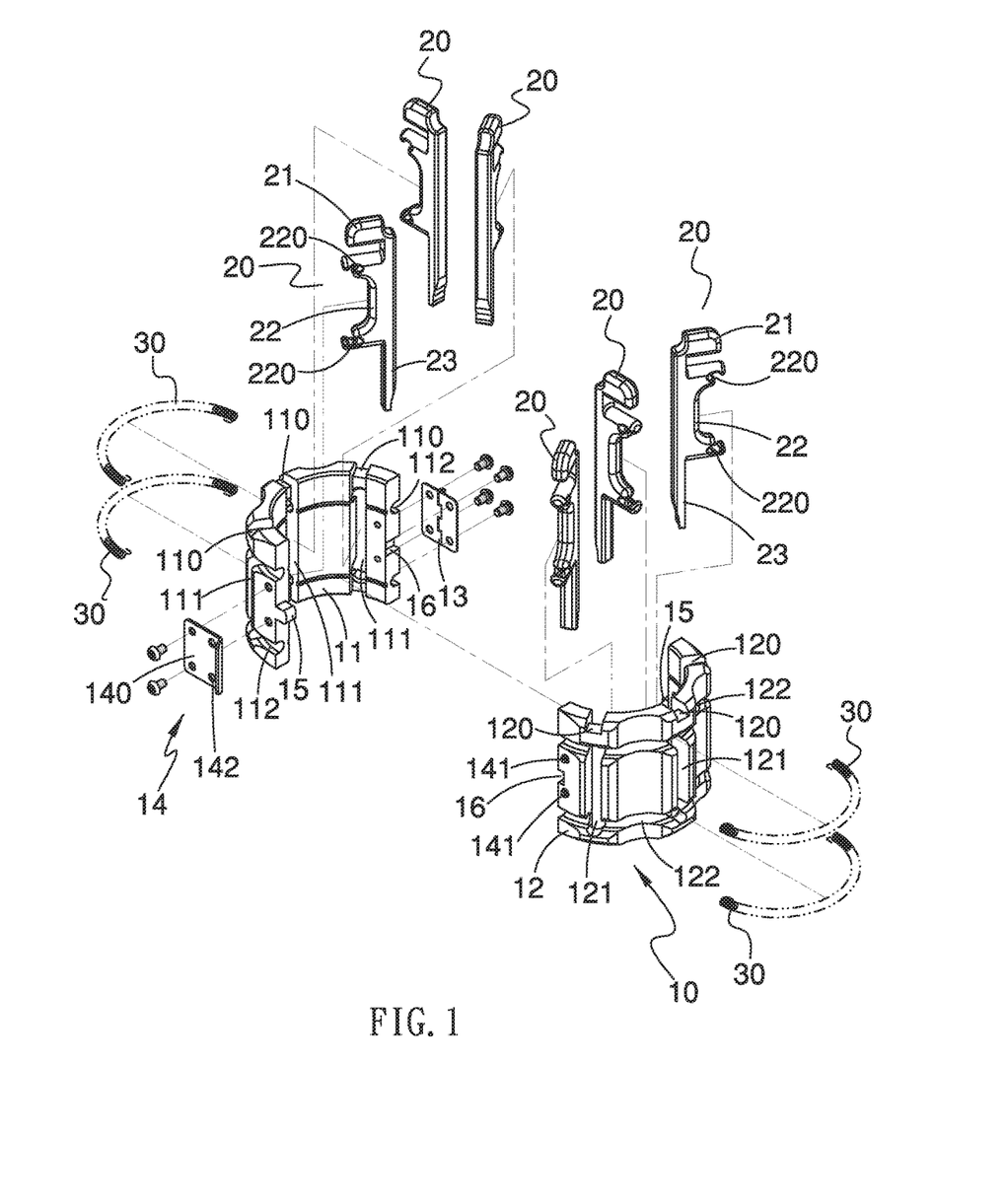
FIG. 1 is a perspective view showing the exploded components of an oil seal holder for a shock absorber according to a preferred embodiment of the present invention.
Figure 2:
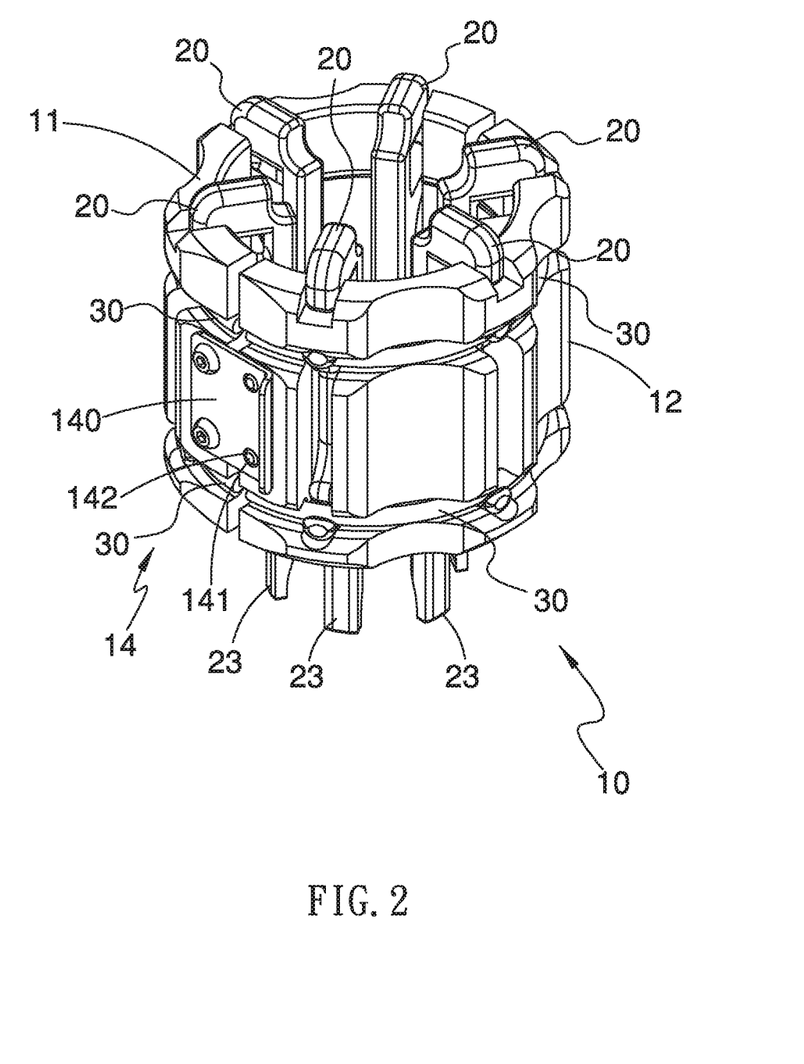
FIG. 2 is a perspective view showing the assembly of the oil seal holder for the shock absorber according to the preferred embodiment of the present invention.
Figure 3:
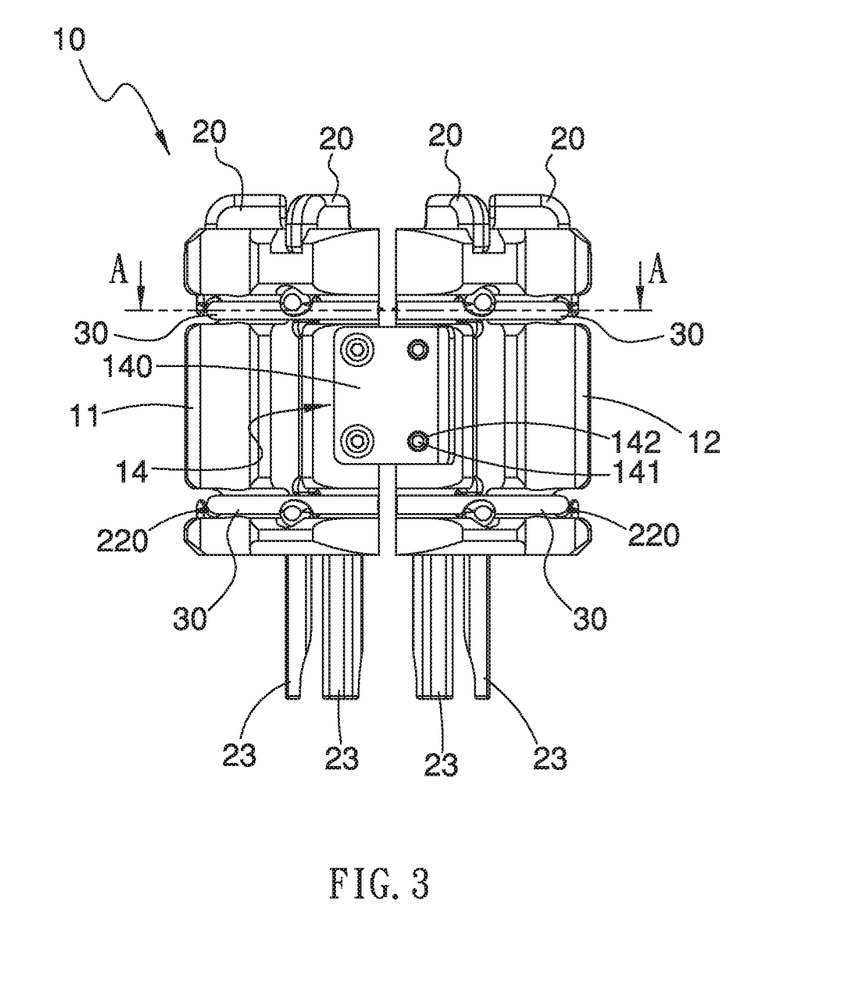
FIG. 3 is a front elevational view showing the assembly of the oil seal holder for the shock absorber according to the preferred embodiment of the present invention.
Figure 4:
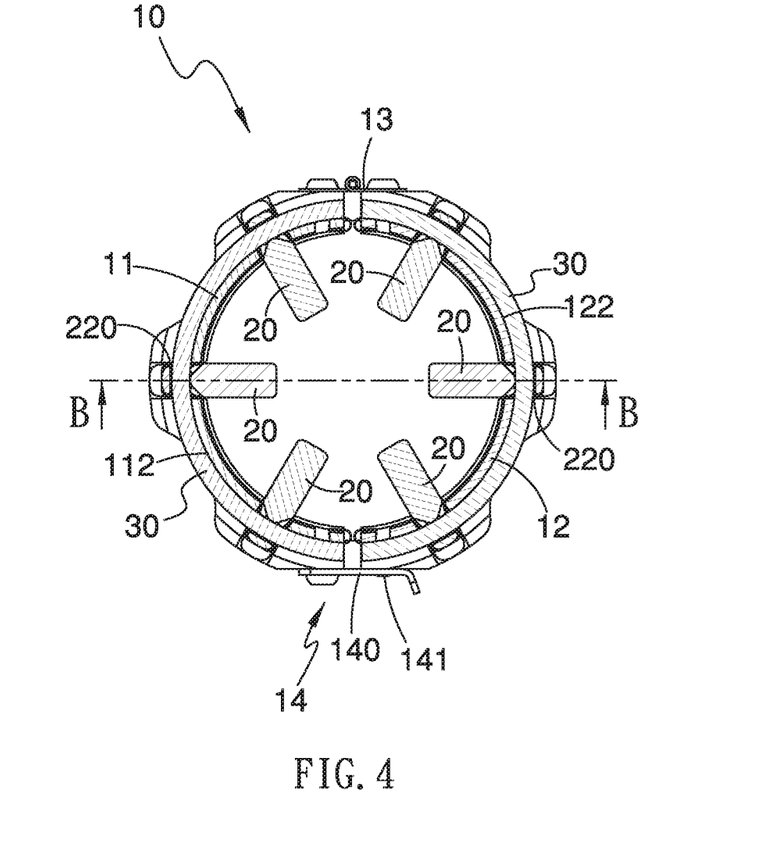
FIG. 4 is a cross sectional view taken along the line A-A of FIG. 3.
Figure 5:
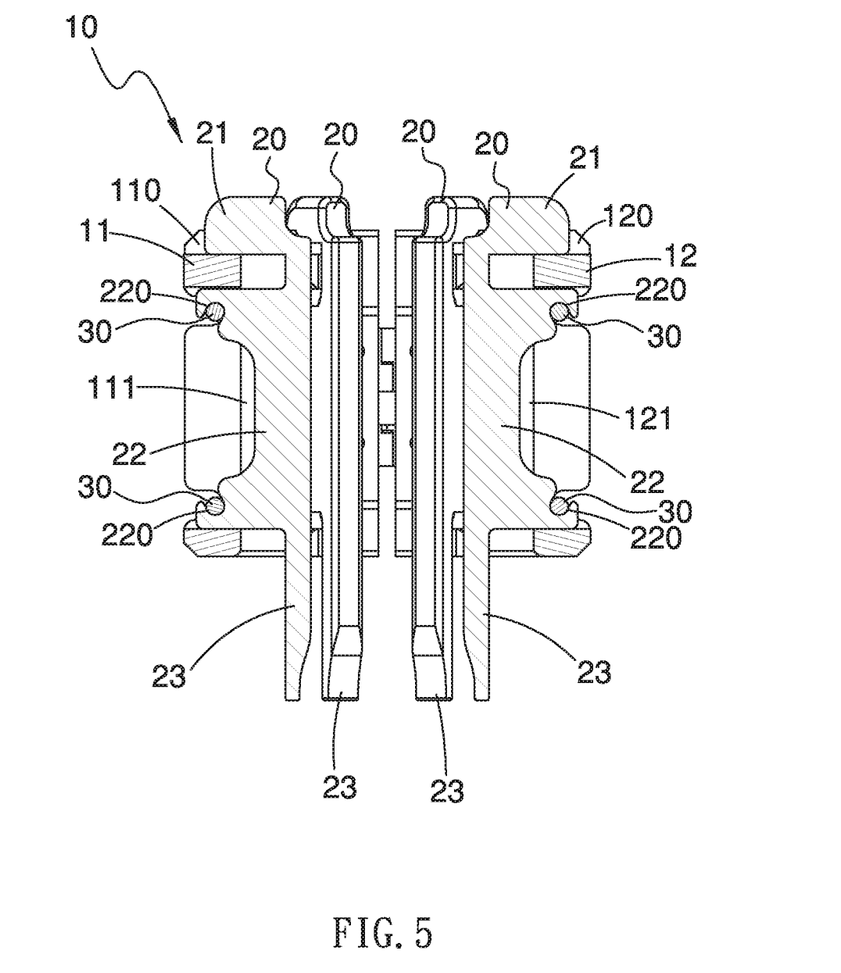
FIG. 5 is a cross sectional view taken along the line B-B of FIG. 4.

With reference to FIGS. 1 to 5, an oil seal holder for a shock absorber according to a preferred embodiment of the present invention comprises a body 10, plural push members 20, and plural resilient elements 30.

The body 10 includes a first semi-circular ring 11, a second semi-circular ring 12, and a hinge 13 rotatably connected with a rear end of the first semi-circular ring 11 and a rear end of the second semi-circular ring 12, such that the rear end of the first semi-circular ring 11 and the rear end of the second semi-circular ring 12 are connected together by using the hinge 13. The body 10 also includes a retainer 14 configured to retain with or remove from a front end of the first semi-circular ring 11 and a front end of the second semi-circular ring 12. The retainer 14 has an elastic piece 140 for connecting with the front end of the first semi-circular ring 11 and has at least one locking element 141 coupled with the front end of the second semi-circular ring 12, the elastic piece 140 has at least one opening 142 configured to connect the first semi-circular ring 11 and the second semi-circular ring 12 with the elastic piece 140. The first semi-circular ring 11 has plural first grooves 110 equidistantly arranged on an outer wall thereof, plural first holes 111 defined in the plural first grooves 110 respectively, and plural first slots 112 communicating with the plural first grooves 111. The second semi-circular ring 12 has plural second grooves 120 equidistantly arranged on an outer wall thereof, plural second holes 121 defined in the plural second grooves 120 respectively, and plural second slots 122 communicating with the plural second grooves 121. Furthermore, plural tabs 15 and plural orifices 16 are formed on connection faces of the first semi-circular ring 11 and the second semi-circular ring 12 respectively so as to retain the first semi-circular ring 11 with the second semi-circular ring 12.

Plural push members 20 are radially moving and mounted on the first semi-circular ring 11 and the second semi-circular ring 12, and each push member 20 includes a guiding block 21, a protrusion 22, and an abutting post 23. The guiding block 21 of said each push member 20 retains in each first groove 110 or each second groove 120, the protrusion 22 engages in each first hole 111 or each second hole 121 so that said each push member 20 radially moves on the first semi-circular ring 11 or the second semi-circular ring 12. The protrusion 22 has plural notches 220 corresponding to the plural first slots 112 or the plural second slots 122. The abutting post 23 extends out of the first semi-circular ring 11 or the second semi-circular ring 12 from a bottom of the protrusion 22.

Each of the plural resilient elements 30 is an extension spring and its two ends connect with the first semi-circular ring 11 and the second semi-circular ring 12 respectively, the two ends of said each resilient element 30 retain in each of the plural first slots 112, of the plural second slots 122, and of the plural notches 220 of said each push member 20 respectively, hence said each resilient element 30 pushes said each push member 20 inward.

In this embodiment, a number of each of the plural first grooves 110, of the plural first holes 111, of the plural second grooves 120, and of the plural second holes 121 is three, and a number of each of the plural first slots 112 and of the plural second slots 122 is two, wherein the plural first slots 112 communicate with the plural first holes 111, and the plural second slots 122 communicate with the plural second holes 121. Thereby, a number of the plural push members 20 is six, a number of the plural resilient elements 30 is four, wherein two of the four resilient elements 30 connect with the first semi-circular ring 11, and the other two of the four resilient elements 30 connect with the second semi-circular ring 12.

Figure 6:
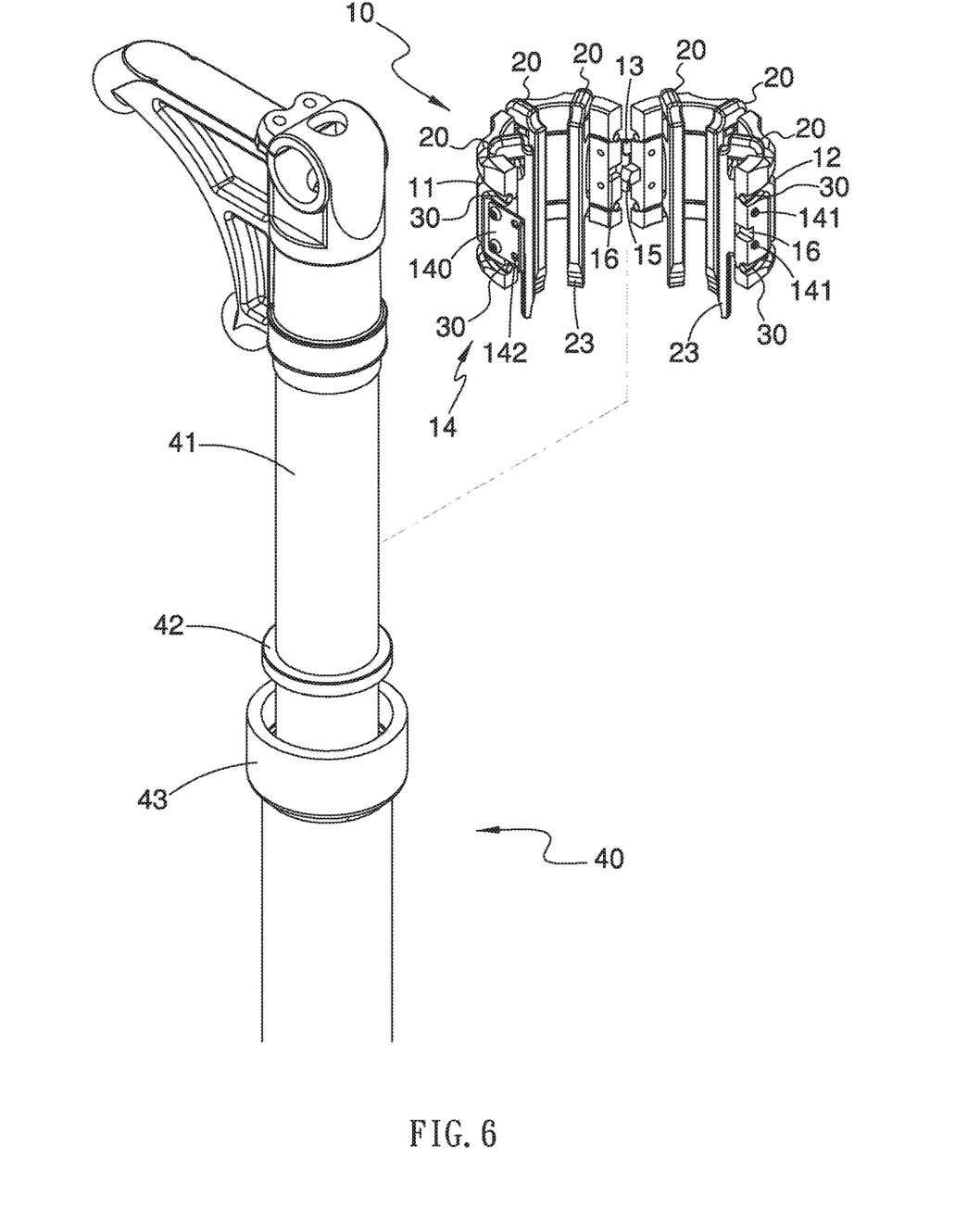
FIG. 6 is a perspective view showing the operation of the oil seal holder for the shock absorber according to the preferred embodiment of the present invention.
Figure 7:
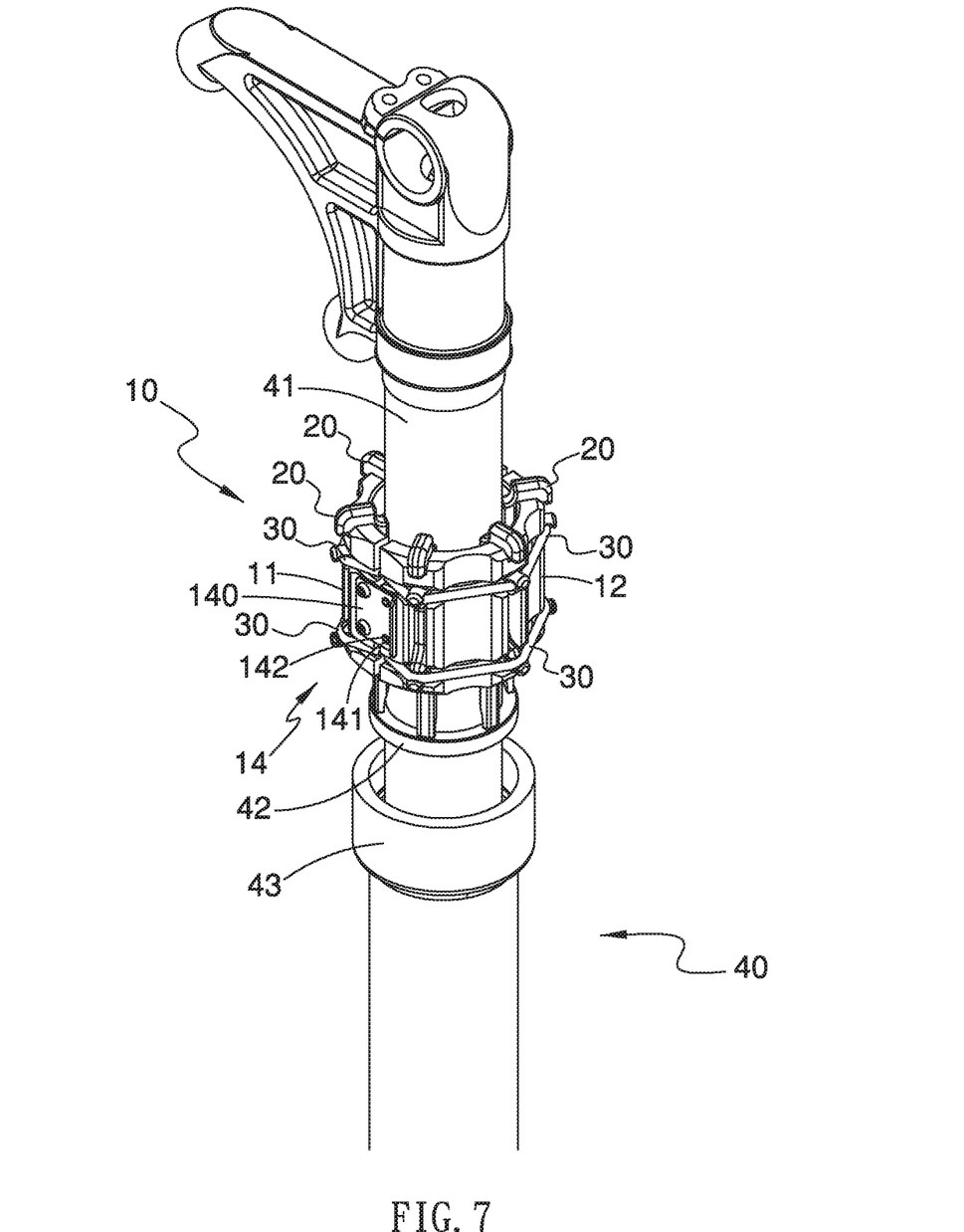
FIG. 7 is another perspective view showing the operation of the oil seal holder for the shock absorber according to the preferred embodiment of the present invention.
Figure 8:
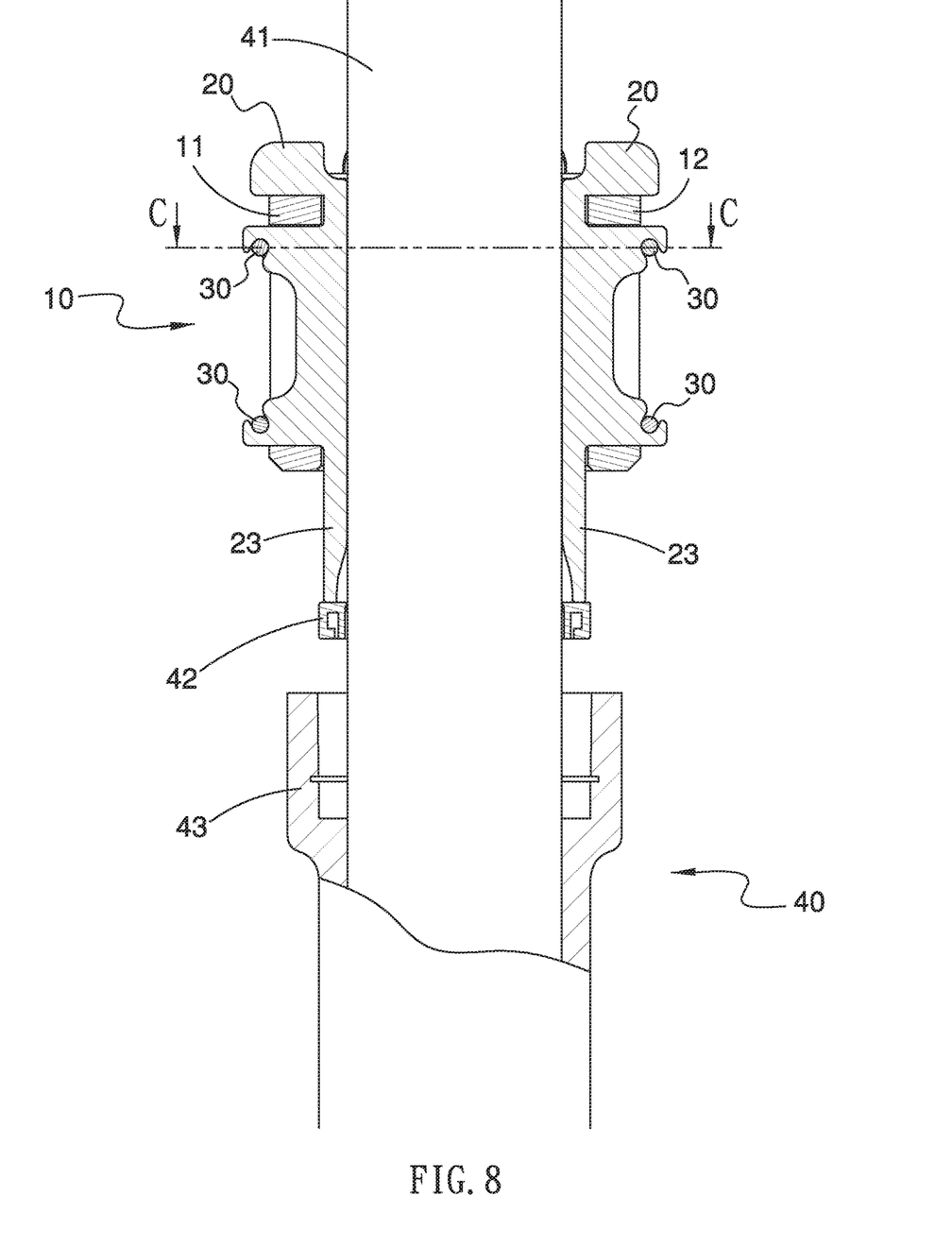
FIG. 8 is a cross sectional view showing the operation of the oil seal holder for the shock absorber according to the preferred embodiment of the present invention.
Figure 9:
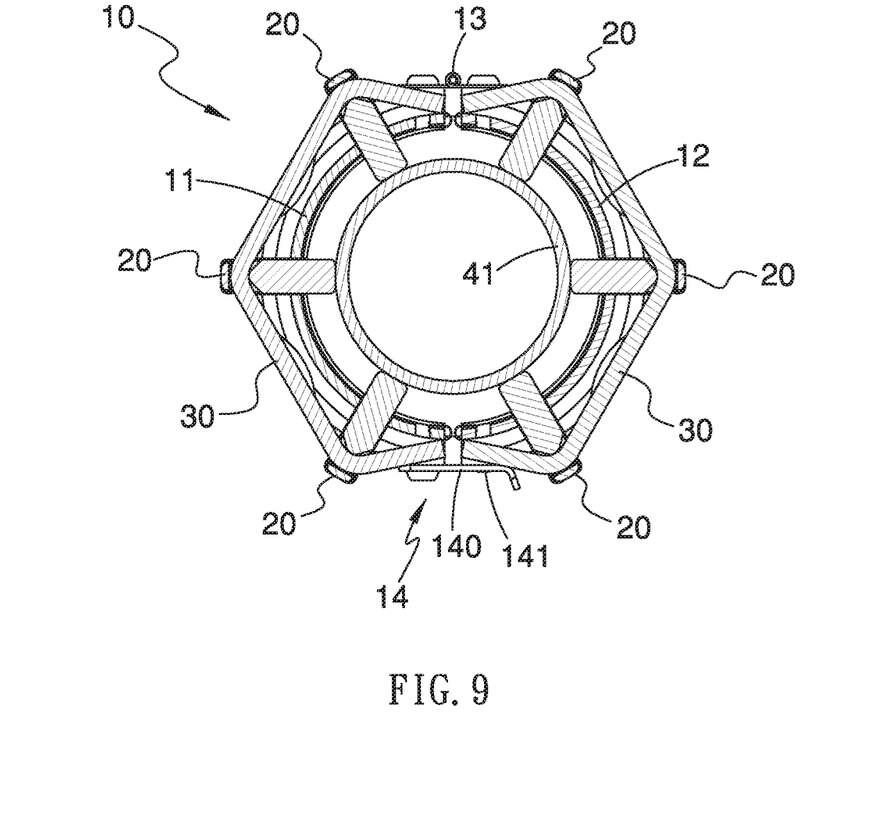
FIG. 9 is a cross sectional view taken along the line C-C of FIG. 8.
Figure 10:
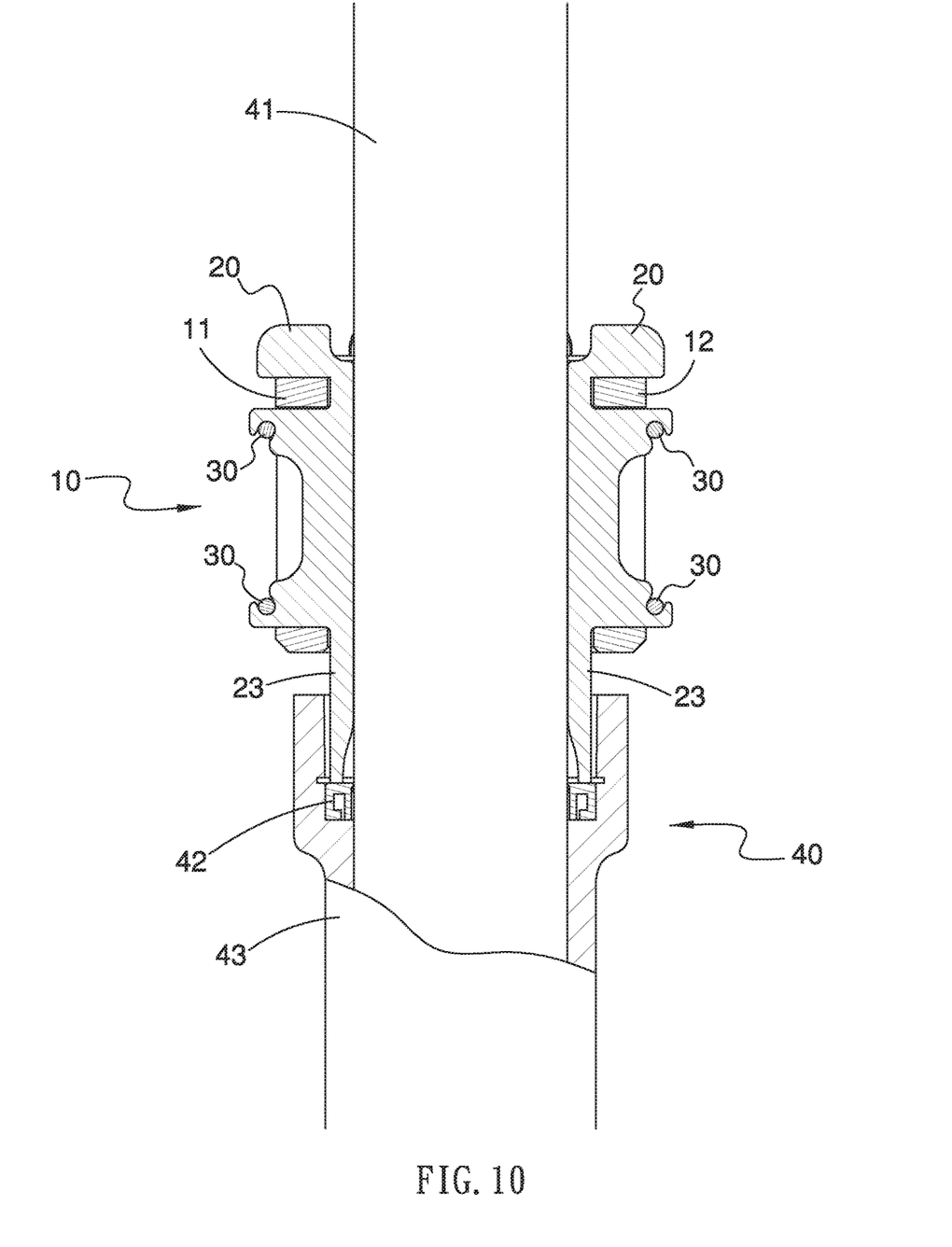
FIG. 10 is another cross sectional view showing the operation of the oil seal holder for the shock absorber according to the preferred embodiment of the present invention.

Referring to FIGS. 6 to 10, the elastic piece 140 of the retainer 14 is pulled outward so that the at least one opening 142 removes from the at least one locking element 141, the first semi-circular ring 11 and the second semi-circular ring 12 are removed from an inner tube 41 of the shock absorber 40, the at least one opening 142 of the elastic piece 140 retains with the at least one locking element 141 so that the first semi-circular ring 11 and the second semi-circular ring 12 are fitted in the inner tube 41. In the meantime, the plural push members 20 of the body 10 contact with an outer wall of the inner tube 41 and are limited by the plural resilient elements 30, hence the body 10 adjustably moves on the inner tube 41, and the abutting post 23 of said each push member 20 pushes an oil seal 42 into an outer tube 43 of the shock absorber 40, thus fixing the oil seal 42 into the outer tube 43.

Thereby, the first semi-circular ring 11 and the second semi-circular ring 12 of the body 10 are connected together or are removed from each other so that the body 10 is fitted on the inner tube 41 of the shock absorber 40. The plural push members 20 radially move on the body 10, and the plural resilient elements 30 push the plural push members 20 inward respectively so that when the first semi-circular ring 11 and the second semi-circular 12 are retained on the inner tube 41, the plural push members 20 are moved toward a desired position of the inner tube 41 quickly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An oil seal holder for a shock absorber comprising:
   a body including a first semi-circular ring and a second semi-circular ring, and a rear end of the first semi-circular ring being connected with a rear end of the second semi-circular ring, the body also including a retainer configured to retain with or remove from a front end of the first semi-circular ring and a front end of the second semi-circular ring;
   plural push members mounted and radially moving on the first semi-circular ring and the second semi-circular ring, and each push member including an abutting post extending out of the first semi-circular ring or the second semi-circular ring;
   plural resilient elements connected with the first semi-circular ring and the second semi-circular ring so as to push the plural push member inward.

2. The oil seal holder for the shock absorber as claimed in claim 1, wherein the body also includes a hinge rotatably connected with the rear end of the first semi-circular ring and the rear end of the second semi-circular ring, such that the first semi-circular ring connects with or removes from the second semi-circular ring, the retainer has an elastic piece for connecting with the front end of the first semi-circular ring and has at least one locking element coupled with the front end of the second semi-circular ring, the elastic piece has at least one opening configured to connect the first semi-circular ring and the second semi-circular ring with the elastic piece.

3. The oil seal holder for the shock absorber as claimed in claim 1, wherein the first semi-circular ring has plural first grooves equidistantly arranged on an outer wall thereof, plural first holes defined in the plural first grooves respectively, and plural first slots communicating with the plural first grooves; the second semi-circular ring has plural second grooves equidistantly arranged on an outer wall thereof, plural second holes defined in the plural second grooves respectively, and plural second slots communicating with the plural second grooves; two ends of each resilient element connects with the first semi-circular ring and the second semi-circular ring respectively and retain in each of the plural first slots and of the plural second slots respectively, hence said each resilient element pushes said each push member inward.

4. The oil seal holder for the shock absorber as claimed in claim 3, wherein said each push member also includes a guiding block and a protrusion; the guiding block of said each push member retains in each first groove or each second groove, the protrusion engages in each first hole or each second hole so that said each push member radially moves on the first semi-circular ring or the second semi-circular ring; the protrusion has plural notches corresponding to the plural first slots or the plural second slots, the abutting post extends out of the first semi-circular ring or the second semi-circular ring from a bottom of the protrusion, and the two ends of said each resilient element retain in each of the plural notches of said each push member, hence said each resilient element pushes said each push member inward.

5. The oil seal holder for the shock absorber as claimed in claim 4, wherein each of the plural resilient elements is an extension spring.

6. The oil seal holder for the shock absorber as claimed in claim 4, wherein a number of each of the plural first grooves, of the plural first holes, of the plural second grooves, and of the plural second holes is three, and a number of each of the plural first slots and of the plural second slots is two, wherein the plural first slots communicate with the plural first holes, and the plural second slots communicate with the plural second holes; and a number of the plural push members is six, a number of the plural resilient elements is four, wherein two of the four resilient elements connect with the first semi-circular ring, and the other two of the four resilient elements connect with the second semi-circular ring.

7. The oil seal holder for the shock absorber as claimed in claim 1, wherein plural tabs and plural orifices are formed on connection faces of the first semi-circular ring and the second semi-circular ring respectively so as to retain the first semi-circular ring with the second semi-circular ring.

* * * * *